(12) United States Patent
Zhang et al.

(10) Patent No.: US 12,516,770 B2
(45) Date of Patent: Jan. 6, 2026

(54) MECHANICAL LIMITING MECHANISM

(71) Applicants: Ankon Medical Technologies (Shanghai) Co., LTD., Shanghai (CN); ANX IP HOLDING PTE. LTD., Singapore (SG)

(72) Inventors: Shaobang Zhang, Shanghai (CN); Yueyue Shen, Shanghai (CN); Xiaodong Duan, Pleasanton, CA (US)

(73) Assignees: ANKON MEDICAL TECHNOLOGIES (SHANGHAI) CO., LTD., Shanghai (CN); ANX IP HOLDING PTE. LTD, Singapore (SG)

( * ) Notice: Subject to any disclaimer, the term of this patent is extended or adjusted under 35 U.S.C. 154(b) by 480 days.

(21) Appl. No.: 18/012,919

(22) PCT Filed: Jun. 24, 2021

(86) PCT No.: PCT/CN2021/102087
§ 371 (c)(1),
(2) Date: Dec. 24, 2022

(87) PCT Pub. No.: WO2021/259359
PCT Pub. Date: Dec. 30, 2021

(65) Prior Publication Data
US 2023/0258226 A1    Aug. 17, 2023

(30) Foreign Application Priority Data
Jun. 24, 2020 (CN) .......................... 202010592572.9

(51) Int. Cl.
*F16M 11/24* (2006.01)
*F16M 11/12* (2006.01)

(52) U.S. Cl.
CPC ............ *F16M 11/24* (2013.01); *F16M 11/126* (2013.01); *F16M 2200/02* (2013.01); *F16M 2200/063* (2013.01)

(58) Field of Classification Search
CPC ........... F16M 11/046; F16M 2200/063; F16M 2200/02; F16M 11/126; F16M 11/124
(Continued)

(56) References Cited

U.S. PATENT DOCUMENTS 2,700,524 A * 1/1955 Lauterbach ............ A61B 6/447
267/173
4,523,732 A * 6/1985 Biber ..................... F16M 11/42
248/125.7

(Continued)

FOREIGN PATENT DOCUMENTS

CN    103006257 A    4/2013
CN    204573503 U    8/2015
(Continued)

*Primary Examiner* — Christopher Garft
(74) *Attorney, Agent, or Firm* — Treasure IP Group, LLC

(57) ABSTRACT

A mechanical limiting mechanism comprises a swivel base, a spring arm, a loading part and a reinforcing arm. The spring arm, the swivel base, the reinforcing arm and the loading part constitute a four-bar mechanism, the loading part moves up and down through the rotation of the spring arm, and a limiting is realized through a contact of the spring arm and the reinforcing arm. When the spring arm and the reinforcing arm drive the loading part to move downwards, after the spring arm is abutted against the reinforcing arm, the four-bar linkage mechanism cannot rotate, a mechanical limiting is realized, and the loading part can be prevented from falling. There is no need to add additional parts, and different height changes of the limiting are realized only by adjusting the size of the spring arm and/or the size of the reinforcing arm.

9 Claims, 4 Drawing Sheets

(58) Field of Classification Search
USPC .......................................................... 248/575
See application file for complete search history.

(56) References Cited

U.S. PATENT DOCUMENTS

| | | | | |
|---|---|---|---|---|
| 4,950,100 | A | * | 8/1990 | Horgas .................. F16M 11/08 403/119 |
| 2003/0146359 | A1 | * | 8/2003 | Oddsen, Jr. ........ F16M 11/2092 248/278.1 |
| 2013/0112828 | A1 | * | 5/2013 | Sapper ............... F16M 11/2092 248/274.1 |
| 2019/0178440 | A1 | | 6/2019 | Chang |

FOREIGN PATENT DOCUMENTS

| | | |
|---|---|---|
| CN | 207349710 U | 5/2018 |
| CN | 109424829 A | 3/2019 |

* cited by examiner

MECHANICAL LIMITING MECHANISM

CROSS-REFERENCE OF RELATED APPLICATIONS

The application is a National Phase Application of PCT International Application No. PCT/CN2021/102087, International Filing Date Jun. 24, 2021, published Dec. 30, 2021 as International Publication Number WO2021/259359A1, which claims priority from Chinese Patent Application No. 202010592572.9, filed Jun. 24, 2020, all of which are incorporated herein by reference in their entirety.

FIELD OF INVENTION

The present invention relates to the technical field of mechanical equipment, and more particularly to a mechanical limiting mechanism.

BACKGROUND

A balance arm system is a device that relies on springs (mechanical springs or gas springs) to balance a load at an end, in a certain space range, so that the load can be freely suspended without help of other external forces. At present, this device is widely used in shadowless lamps, monitors, and other equipment systems in hospitals. As a suspension system, functional spring components of the balance arm system have a high reliability within the allowable design load weight in hospital equipment application environment. However, due to the requirements of testing standards for medical devices, there must be a mechanical limiting method to deal with the risk of loads falling caused by spring failure (mechanical spring fatigue, spring disconnection, gas spring failure, etc.).

SUMMARY OF THE INVENTION

The present invention provides a mechanical limiting mechanism which can prevent a load from falling.

The present invention provides a mechanical limiting mechanism comprising:

a swivel base;

a spring arm, and wherein a first end of the spring arm is connected to the swivel base;

a loading part for carrying a load, wherein a second end of the spring arm is connected to the loading part; and a reinforcing arm, wherein a first end of the reinforcing arm is connected to the swivel base, and a second end of the reinforcing arm is connected to the loading part, so that the spring arm, the swivel base, the reinforcing arm and the loading part constitute a four-bar linkage mechanism;

a limiting of the spring arm and the reinforcing arm is realized by a contact of the spring arm and the reinforcing arm, and a height change of the limiting is realized by adjusting the size of the spring arm and/or the size of the reinforcing arm.

Further, the first end of the spring arm is connected to the swivel base through a first pivot, and the second end of the spring arm is connected to the loading part through a second pivot;

the first end of the reinforcing arm is connected to the swivel base through a third pivot, and the second end of the reinforcing arm is connected to the loading part through a fourth pivot.

Further, a relationship between a distance L3 from a part of the reinforcing arm for contacting with the spring arm to the axis of the fourth pivot and a radius R of the spring arm is:

$$L3 = L1^* \sqrt{1 - \left(\frac{H}{L4}\right)^2} - h - R;$$

wherein, L1 is an axial distance between the first pivot and the third pivot, L4 is an axial distance between the third pivot and the fourth pivot, h is a gap formed between the part of the reinforcing arm for contacting with the spring arm and an outer wall of the spring arm, and H is a distance of descending of the loading part.

Further, the spring arm is arranged as a cylindrical structure, the reinforcing arm is arranged as a groove-shaped structure, and an opening of the groove-shaped structure faces to the spring arm; and a support member is disposed inside the groove-shape structure and the support member protrudes from the bottom of the groove-shaped structure along the height direction of the groove-shaped structure, and extends along the arm length direction of the reinforcing arm, and the top of the support member is used for abutting against the spring arm.

Further, along the arm length direction of the reinforcing arm, the groove-shaped structure of the reinforcing arm comprises end plates arranged at two ends of the groove-shaped structure, and the end plates are all connected to side walls of the groove-shaped structure;

one side of the end plates facing the spring arm is formed into a curved surface, and the curved surface coincides with the cross-sectional shape of the spring arm.

Further, the spring arm is arranged as a cylindrical structure, the surface of the reinforcing arm close to the spring arm is a cambered surface, the cambered surface at least partially coincides with the cylindrical surface and is used for abutting against the spring arm, and the reinforcing arm is configured as a hollow structure or a solid structure.

Further, the spring arm is arranged as a cylindrical structure, the surface of the reinforcing arm close to the spring arm is a flat surface, and the flat surface is used for abutting against the spring arm.

Further, the spring arm is in contact with the reinforcing arm through a first limit part thereof, the reinforcing arm is in contact with the spring arm through a second limit part thereof, and the first limit part is abutted against the second limit part to limit the spring arm.

Further, the spring arm comprises a bar and a spring is disposed in the bar. One end of the spring is connected to the bar, the other end of the spring is connected to the swivel base, and keep the spring be always in a stretched state.

Further, one end of a first connecting rod is fixedly connected to the spring arm, and the other end of the first connecting rod is hinged to the swivel base; and one end of a second connecting rod is fixedly connected to the spring arm, and the other end of the second connecting rod is hinged to the loading part.

The technical solution provided by the present invention can achieve the following beneficial effects:

The mechanical limiting mechanism provided by the present invention comprises a swivel base, a spring arm, a loading part and a reinforcing arm, wherein the spring arm, the swivel base, the reinforcing arm and the loading part constitute a four-bar linkage mechanism; the loading part moves up and down through the rotation of the spring arm;

and when an elastic member of the spring arm fails, a limiting is realized through a contact between the spring arm and the reinforcing arm. When the spring arm and the reinforcing arm drive the loading part to move downwards, after the spring arm is abutted against the reinforcing arm, the four-bar linkage mechanism cannot rotate further, so that a mechanical limiting is realized, and the loading part can be prevented from falling. In addition, there is no need to add additional parts, and different limit heights can be realized only by adjusting the size of the spring arm and/or the size of the reinforcing arm, and which is convenient to use and with a simple structure.

It should be understood that the above general description and the details to be set forth in the following text are only exemplary, which are not intended to limit the invention.

MARKS IN THE DRAWINGS

Figure 1:
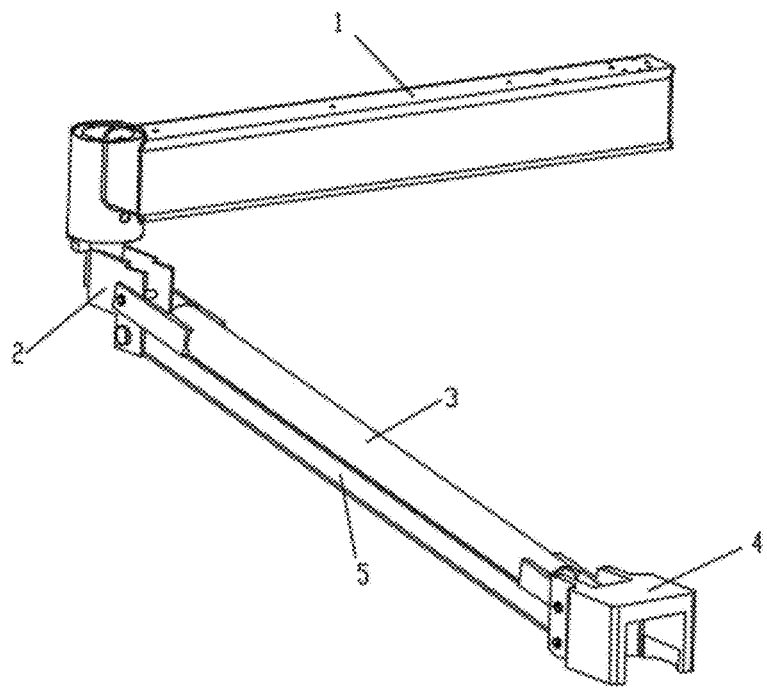
FIG. 1 shows a schematic view of a mechanical limiting mechanism according to the embodiments of the present invention.

1—Horizontal arm;
2—Swivel base;
3—Spring arm;
31—First pivot;
32—Second pivot;
33—First limit part;
34—First connecting rod;
35—Second connecting rod;
36—Bar;
37—Spring;
4—Loading part;
5—Reinforcing arm;
51—Third pivot;
52—Fourth pivot;
53—Second limit part;
54—Support member.

The drawings herein are incorporated in and constitute a part of the specification, illustrate the embodiments consistent with the invention and are used together with the specification to explain the principles of the present invention.

DETAILED DESCRIPTION

In order to better understand technical solutions of the present application, embodiments of the present application are described in detail below in conjunction with the accompanying drawings.

It should be clear that the embodiments described are only a portion of the embodiments of the present application. Based on the embodiments in the present application, all other embodiments obtained by a person of ordinary skill in the art without creative labor fall within the scope of protection of the present application.

In one specific embodiment, the present application is described in further detail below by way of specific embodiments and in conjunction with the accompanying drawings.

As shown in FIGS. 1-3 and FIG. 7, the embodiment of the present application provides a mechanical limiting mechanism, comprising a swivel base 2, a spring arm 3, a loading part 4 and a reinforcing arm 5, wherein the spring arm 3, the swivel base 2, the reinforcing arm 5 and the loading part 4 constitute a four-bar linkage mechanism, and all components in the four-bar linkage mechanism are rotatably connected. The loading part 4 moves up and down through the rotation of the spring arm 3, and when an elastic member of the spring arm 3 fails elastically, a limiting is realized through a contact between the spring arm 3 and the reinforcing arm 5. When the spring arm 3 and the reinforcing arm 5 drive the loading part 4 to move downwards, after the spring arm 3 is abutted against the reinforcing arm 5, the four-bar linkage mechanism cannot rotate further, so that a mechanical limiting is realized, and the loading part can be prevented from falling. In addition, there is no need to add additional parts, and different height changes of the limiting can be realized only by adjusting the size of the spring arm 3 and/or the size of the reinforcing arm 5, and which is convenient to use and with a simple structure. In addition, the mechanical limiting mechanism further comprises a horizontal arm 1. The horizontal arm 1 is connected to a mechanical equipment, the swivel base 2 is installed on the horizontal arm 1, and the horizontal arm 1 can drive the swivel base 2 to move and support the swivel base 2.

The size of the spring arm 3 and/or the size of the reinforcing arm 5 specifically comprise shape and shape size, and are different due to different structures of the spring arm 3 and/or the reinforcing arm 5. Specifically, when the cross section of the spring arm 3 perpendicular to the arm length direction is a rectangle, the size of the spring arm 3 can be the length, width or diagonal line of the cross section of the spring arm 3. For another example, when the cross section of the spring arm 3 perpendicular to the arm length direction is an ellipse, the size of the spring arm 3 can be the major axis or minor axis of the cross section of the spring arm 3; Alternatively, when the reinforcing arm 5 is a groove-shaped structure, the size of the reinforcing arm 5 can be the diameter of the groove or the depth of the groove.

Specifically, a first end of the spring arm 3 is connected to the swivel base 2 through a first pivot 31, and a second end of the spring arm 3 is connected to the loading part 4 through a second pivot 32, so that two ends of the spring arm 3 are respectively hinged to the swivel base 2 and the loading part 4. A first end of the reinforcing arm 5 is connected to the swivel base 2 through a third pivot 51, and a second end of the reinforcing arm 5 is connected to the loading part 4 through a fourth pivot 52, so that two ends of the reinforcing arm 5 are respectively hinged to the swivel base 2 and the loading part 4. The spring arm 3, the swivel base 2, the reinforcing arm 5 and the loading part 4 constitute a four-bar linkage mechanism, and the connections between components in the four-bar linkage mechanism are a rotatable connection, which facilitates the rotation of the spring arm 3 and the reinforcing arm 5 to drive the loading part 4 to move up and down.

In a preferred embodiment of the present application, the spring arm 3 is of a cylindrical structure, and different height changes of the limiting are realized by adjusting the radius of the spring arm 3 or the height of the reinforcing arm 5. In other embodiments of the present application, the spring arm 3 is of a tubular structure, and different limit heights are realized by adjusting the outer diameter of the spring arm 3 or the height of the reinforcing arm 5. Different height changes of the limiting can be realized by adjusting the size of the spring arm 3 and/or the size of the reinforcing arm 5, which has the advantages of simple structure and convenient use.

It should be noted that when the length of the spring arm 3 is unchanged, the distance between the spring arm 3 and the reinforcing arm 5 can be gradually reduced as the spring arm 3 swings downward until the spring arm 3 and the reinforcing arm 5 are in contact. After the spring arm 3 is abutted against the reinforcing arm 5, the four-bar linkage mechanism cannot rotate further, so the spring arm 3 and the reinforcing arm 5 can stop rotating through the interaction between the spring arm 3 and the reinforcing arm 5, and the loading part 4 also stops moving, thereby realizing the purpose of limit.

Figure 2:
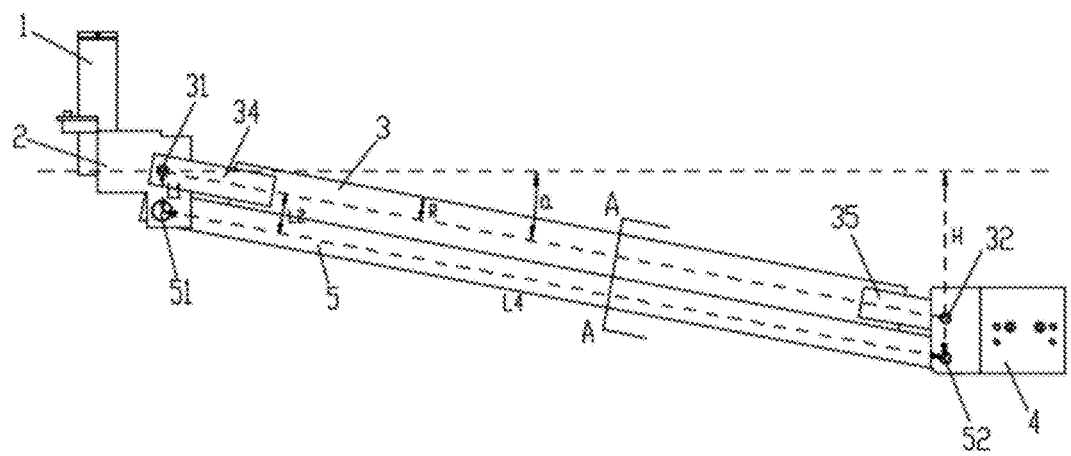
FIG. 2 shows a front view of the mechanical limiting mechanism according to the embodiments of the present invention.
Figure 3:
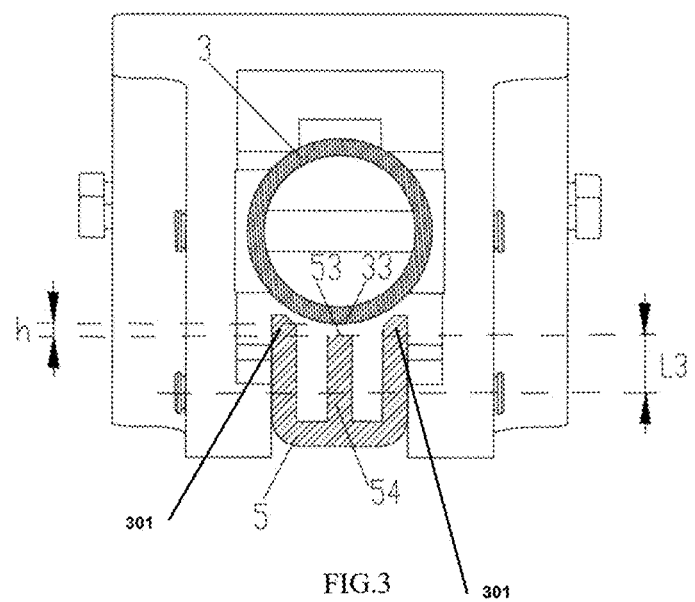
FIG. 3 shows a sectional view based on A-A in FIG. 2 according to an embodiment of the present invention.

In a specific embodiment, as shown in FIGS. 2 and 3, the relationship between a distance L3 from a part of the reinforcing arm 5 for contacting with the spring arm 3 to the axis of the fourth pivot 52 and a radius R of the spring arm 3 is:

$$L3 = L1^* \sqrt{1 - \left(\frac{H}{L4}\right)^2} - h - R;$$

wherein, L1 is an axial distance between the first pivot 31 and the third pivot 51, L4 is an axial distance between the third pivot 51 and the fourth pivot 52, h is a gap formed between the part of the reinforcing arm 5 for contacting with the spring arm 3 and an outer wall of the spring arm 3, and H is a distance of descending of the loading part 4.

Therefore, according to the formula, it is not difficult to find that different height changes of the limiting can be achieved only by adjusting the gap formed between a part of the reinforcing arm 5 for contacting with the spring arm 3 and an outer wall of the spring arm 3. As for h, in different embodiments, the part of the reinforcing arm 5 for contacting with the spring arm 3 is variable, so that both of the specific structures are different according to actual situation, h is also different. In the embodiments of the present application, h is an exemplary description, and h in the present application can refer to the minimum distance between the outer surface of the spring arm 3 and the upper surface of the reinforcing arm 5, or can refer to the distance between the outer surface of the spring arm 3 and the upper surface of the reinforcing arm 5 along the radial direction of a cross section of the spring arm 3 (when it is a cylinder). It can also be the distance between the outer surface of the spring arm 3 and the top of the side wall of the reinforcing arm 5, or the distance between other contact parts between the two, as long as the limiting can be adjusted by adjusting h.

It should be noted that, when it is necessary to set the maximum descending distance of the loading part 4, the loading part 4 can be firstly descended to the set position (that is, the loading part 4 is firstly descended to the lowest position), and then the axial distance L4 between the third pivot 51 and the fourth pivot 52 as well as the descending distance H of the loading part 4 are measured, and the angle of a can be calculated through the formula sin(a)=H/L4. Since the axial distance between the first pivot 31 and the third pivot 51 can also be measured, the length of L2, which is the axial distance between the reinforcing arm 5 and the spring arm 3, is then calculated by the formula L2=L1*cos (a). Since the gap h between the part of the reinforcing arm 5 for contacting with the spring arm 3 and the outer wall of the spring arm 3 can also be measured, the relationship between the distance L3 from the part of the reinforcing arm 5 for contacting with the spring arm 3 to the axis of the fourth pivot 52 and the radius R of the spring arm 3 can be calculated by the formula h=L2–L3–R. Different height changes of the limiting can be achieved by adjusting L3 and/or R.

In a specific embodiment, as shown in FIG. 3, the part of the spring arm 3 for contacting with the reinforcing arm 5 is a first limit part 33, and the part of the reinforcing arm 5 for contacting with the spring arm 3 is a second limit part 53. The first limit part 33 is abutted against the second limit part 53, and in the case that the elastic member of the spring arm 3 fails elastically, the spring arm 3 is abutted against the reinforcing arm 5, so that the four-bar linkage mechanism cannot rotate further. Therefore, through the interaction between the spring arm 3 and the reinforcing arm 5, the spring arm 3 and the reinforcing arm 5 can stop rotating and the loading part 4 also stops moving, which can prevent the loading part 4 or a load mounted on the loading part 4 from falling.

In a specific embodiment, as shown in FIG. 3, the spring arm 3 is arranged as a cylindrical structure, the reinforcing arm 5 is arranged as a groove-shaped structure, and an opening of the groove-shaped structure faces to the spring arm 3. A support member 54 is disposed inside the groove-shaped structure, and the support member 54 protrudes from the bottom of the groove-shaped structure along the height direction of the groove-shaped structure, and extends along the arm length direction of the reinforcing arm 5, and the top of the support member 54 is used for abutting against the spring arm 3. The support member 54 and the groove-shaped structure combine into an E-shaped structure, and the arrangement of the support member 54 can help the side wall to share the pressure of the spring arm 3 on the reinforcing arm 5 in the vertical direction, and reduce the positive pressure on two side walls of the reinforcing arm 5, so as to protect the reinforcing arm structure, increase the upper limit of the force on the reinforcing arm 5, and further enhance the limit reliability. Meanwhile, the top of the support member 54 can be used as the second limit part 53. After the first limit part 33 is abutted against the second limit part 53, the spring arm 3 and the reinforcing arm 5 can stop rotating through the interaction between the first limit part 33 and the second limit part 53, so that the spring arm 3 can be limited to continue to swing downward.

Wherein, along the length direction of the groove-shaped structure, two side walls of the groove-shaped structure form an arc-shaped fitting part for abutting against the spring arm, and at this point, the tops of the two side walls can be inclined surfaces or cambered surfaces, etc., for fitting with the outer wall of the spring arm 3. Along the width direction of the groove-shaped structure, the fitting parts formed by the side walls at both ends of the groove-shaped structure can fit the spring arm 3 in its radial direction, and have a height lower than the height of the two side walls along the length direction of the groove-shaped structure.

Preferably, in order to improve the ability of the reinforcing arm 5 to bear the load, along the arm length direction of the reinforcing arm 5, the groove-shaped structure can further comprise two end plates arranged at two ends of the reinforcing arm 5, and the two end plates are both connected to the two side walls of the groove-shaped structure, so that the grooved structure is firmer. More preferably, one side of the two end plates facing the spring arm 3 is formed into a curved surface, and the curved surface coincides with the cross-sectional shape of the spring arm 3, so as to further limit the relative movement generated after the contact between the spring arm 3 and the reinforcing arm 5, and improve the limit reliability. It is worth mentioning that in other embodiments of the present application, a plurality of support members (not shown) can also be disposed in the groove-shaped structure to enhance the reliability of the reinforcing arm 5.

Figure 4:
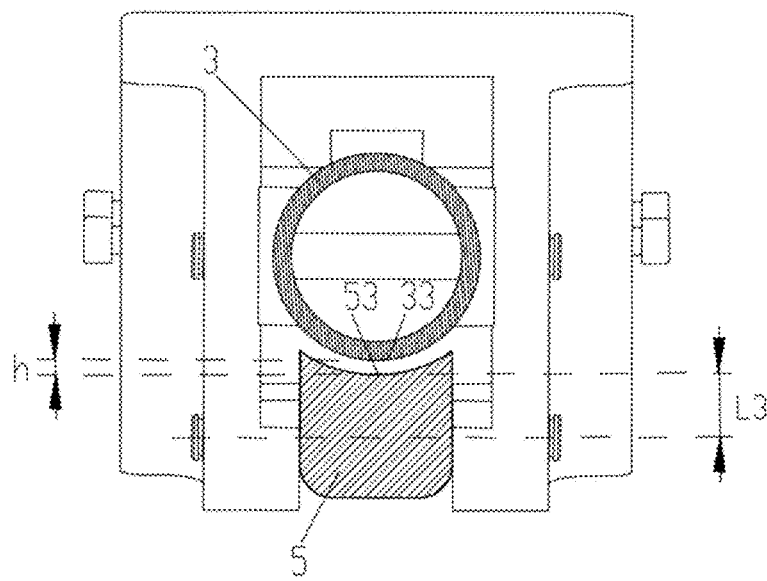
FIG. 4 shows a sectional view based on A-A in FIG. 2 according to another embodiment of the present invention.
Figure 5:
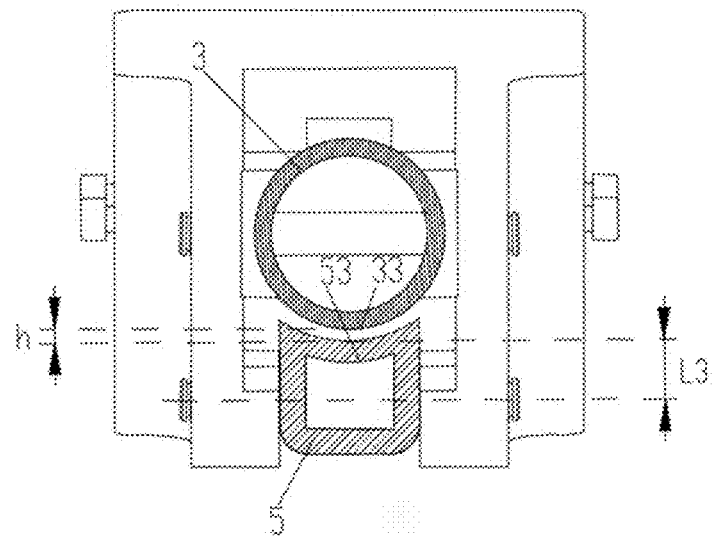
FIG. 5 shows a sectional view based on A-A in FIG. 2 according to another embodiment of the present invention.

In another specific embodiment, as shown in FIG. 4 and FIG. 5, the spring arm 3 is arranged as a cylindrical structure, and the surface of the reinforcing arm 5 close to the spring arm 3 is a cambered surface. The cambered surface at least partially coincides with the cylindrical surface, and the cambered surface is used for abutting against the spring arm 3. The cambered surface can be used as the second limit part 53, and the cylindrical surface matched with the cambered surface can be used as the first limit part 33. The first limit part 33 and the second limit part 53 can disperse the force on the two side walls of the reinforcing arm 5 and reduce the positive pressure on the two side walls through surface contact, so as to protect the reinforcing arm structure. In addition, the spring arm 3 and the reinforcing arm 5 can be stopped from rotating through the interaction between the first limit part 33 and the second limit part 53 after the contact between the first limit part 33 and the second limit part 53, so that the spring arm 3 can be prevented from continuously swinging downward.

As shown in FIG. 5, the reinforcing arm 5 can be a hollow structure (that is, the reinforcing arm 5 can be hollow and similar to a cylinder rather than a groove), and a complete arc-shaped butting plate is formed on one side of the reinforcing arm 5 close to the spring arm 3, and the arc-shaped butting plate has a so appropriate radian that it can fit the spring arm 3.

Alternatively, as shown in FIG. 4, the reinforcing arm 5 can also be a solid structure, one side of the reinforcing arm 5 close to the spring arm 3 is formed into an arc-shaped recess, and the surface of the recess can be abutted against the spring arm 3.

Figure 6:
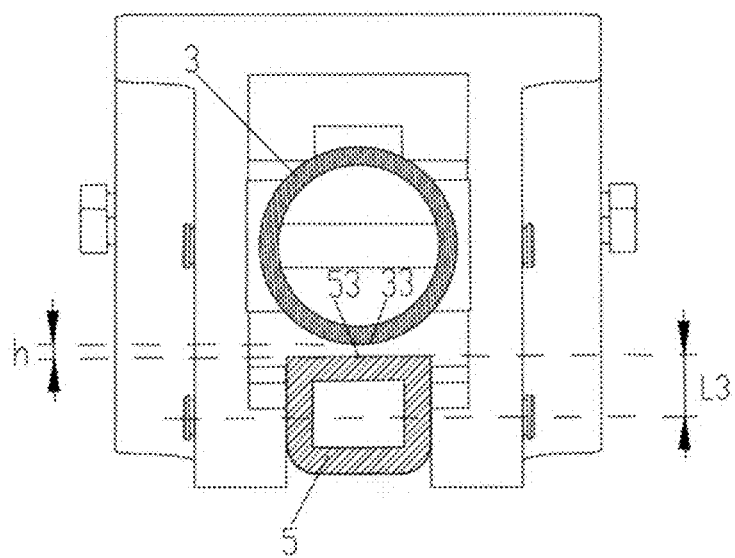
FIG. 6 shows a sectional view based on A-A in FIG. 2 according to another embodiment of the present invention.

In another embodiment of the present application, as shown in FIG. 6, the spring arm 3 is arranged as a cylindrical structure, and the part of the reinforcing arm 5 for contacting with the spring arm 3 is a flat surface, and the flat surface is used for abutting against the spring arm 3 during limiting. In this embodiment, the flat surface is used as the second limit part 53. After the first limit part 33 is abutted against the second limit part 53, the spring arm 3 and the reinforcing arm 5 can stop rotating through the interaction between the first limit part 33 and the second limit part 53, so that the spring arm 3 can be limited to continue to rotate downward.

Figure 7:
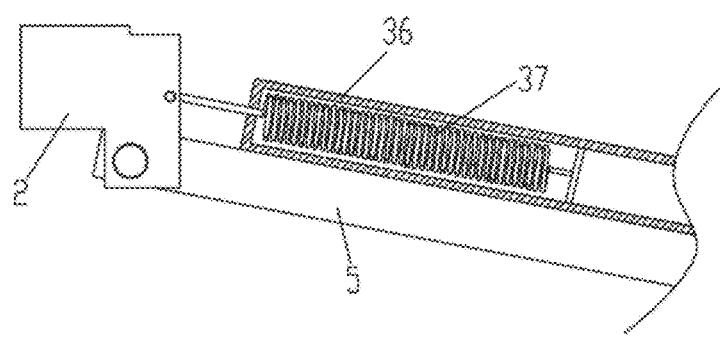
FIG. 7 shows a partial sectional view of the mechanical limiting mechanism according to the embodiments of the present invention.

In the embodiment, as shown in FIG. 2 and FIG. 7, a first end of the spring arm 3 is connected to the swivel base 2 through a first connecting rod 34, and a second end of the spring arm 3 is connected to the loading part 4 through a second connecting rod 35. During installation of the spring arm 3, only the first connecting rod 34 and the second connecting rod 35 are needed to install the spring arm 3, which is very convenient.

Specifically, as shown in FIG. 2, one end of the first connecting rod 34 is fixedly connected to the spring arm 3, and the other end of the first connecting rod 34 is hinged to the swivel base 2, so that the spring arm 3 can rotate around the swivel base 2. One end of the second connecting rod 35 is fixedly connected to the spring arm 3, and the other end of the second connecting rod 35 is hinged to the loading part 4, so that the spring arm 3 and the loading part 4 can be rotatably connected, and the loading part 4 can move up and down when the spring arm 3 rotates. Further, as shown in FIG. 7, the spring arm 3 comprises a bar 36, in which a spring 37 (i.e., an elastic member of the spring arm 3) is disposed. One end of the spring 37 is connected to the bar 36, and the other end of the spring 37 is connected to the swivel base 2, so that the spring 37 is in a stretched state, and thus has a contraction force. The contraction force can be divided into two components in vertical and horizontal directions. When the loading part 4 is not provided with a load, the vertical component of the contraction force of the spring 37 can cause the spring arm 3 to rotate upward or have a tendency to rotate upward around the position where the first connecting rod 34 and the swivel base 2 are hinged. When the loading part 4 is provided with a load and the gravity of the load is greater than the component force of the spring arm 3 in the vertical direction, the spring arm 3 rotates downward around the hinge point. As the spring arm 3 gradually rotates downward, the contraction force of the spring arm 3 gradually increases, while the angle between the spring arm 3 and the vertical direction also gradually increases, so that the vertical component of the contraction force of the spring 37 gradually increases, until the vertical component of the contraction force is the same as the gravity of the load, at which point, the spring arm 3 no longer rotates, and the mechanism is in a balanced state.

In actual work, the component force of the spring arm 3 in the vertical direction is to balance the gravity of the load set on the loading part 4, so that the loading part 4 can be driven to move by a small force from the outside. The position of the loading part 4 is controlled by the force applied from the outside, and in the working state, the loading part 4 is moved within the working range by the action of the driving force. During work, if the spring 37 fails elastically, the spring arm 3 can continue to move downward until the first limit part 33 of the spring arm 3 is abutted against the second limit part 53 of the reinforcing arm 5. The mutual restriction between the first limit part 33 and the second limit part 53 can make the spring arm 3 and the reinforcing arm 5 stop rotating and can restrict the spring arm 3 from continuing to rotate downward. Therefore, when the spring 37 fails elastically, the mechanical limiting mechanism can limit the loading part 4 through the interaction between the spring arm 3 and the reinforcing arm 5, so as to prevent the loading part 4 and the load disposed thereon from falling.

Wherein, one end of the spring 37 is connected to the swivel base 2 through a first connecting member, and the other end of the spring 37 is connected to the inner wall of the bar 36 through a second connecting member. One end of the first connecting member is fixedly connected to the spring 37, and the other end of the first connecting member is hinged to the swivel base 2, so that the spring 37 can rotate around the swivel base 2. One end of the second connecting member is fixedly connected to the spring 37, and the other end of the second connecting member is fixedly connected to the inner wall of the bar 36, which can ensure that one end of the spring 37 is fixed, and when the spring arm 3 rotates, the spring 37 can rotate with the spring arm 3, at which point, the spring 37 can be stretched.

Alternatively, one end of the spring 37 is connected to the swivel base 2 through a first connecting member, and the other end of the spring 37 is connected to the loading part 4 through a second connecting member. One end of the first connecting member is fixedly connected to the spring 37, and the other end of the first connecting member is hinged to the swivel base 2, so that the spring 37 can rotate around the swivel base 2. One end of the second connecting member is fixedly connected to the spring 37, and the other end of the second connecting member is hinged to the loading part 4, so that the spring 37 can rotate around the loading part 4, and when the spring arm 3 rotates, the spring 37 can rotate with the spring arm 3, at which point, the spring 37 can be stretched.

The person skilled in the art realizes that the present invention by no means is limited to the preferred embodiments described above. On the contrary, many modifications and variations are possible within the scope of the appended claims. Any modifications, equivalent substitutions, improvements, etc. made within the spirit and principles of this disclosure are intended to be included within the scope of the present invention.

The invention claimed is:

1. A mechanical limiting mechanism, comprises:
a swivel base (2);
a spring arm (3), wherein a first end of the spring arm (3) is connected to the swivel base (2);
a loading part (4) for carrying a load, wherein a second end of the spring arm (3) is connected to the loading part (4); and
a reinforcing arm (5), wherein a first end of the reinforcing arm (5) is connected to the swivel base (2), and a second end of the reinforcing arm (5) is connected to the loading part (4), so that the spring arm (3), the swivel base (2), the reinforcing arm (5) and the loading part (4) constitute a four-bar linkage mechanism; wherein
a limiting of the spring arm (3) and the reinforcing arm (5) is realized by a contact of the spring arm (3) and the reinforcing arm (5), and a height change of the limiting is realized by adjusting the size of the spring arm (3) and/or the size of the reinforcing arm (5),
wherein the spring arm (3) is arranged as a cylindrical structure, the reinforcing arm (5) is arranged as a groove-shaped structure, and an opening of the groove-shaped structure faces to the spring arm (3); and wherein a support member (54) is disposed inside the groove-shaped structure, and the support member (54) protrudes from the bottom of the groove-shaped structure along the height direction of the groove-shaped structure, and extends along the arm length direction of the reinforcing arm (5), and the top of the support member (54) is for abutting against the spring arm (3).

2. The mechanical limiting mechanism of claim 1, wherein the first end of the spring arm (3) is connected to the swivel base (2) through a first pivot (31), and the second end of the spring arm (3) is connected to the loading part (4) through a second pivot (32); and wherein the first end of the reinforcing arm (5) is connected to the swivel base (2) through a third pivot (51), and the second end of the reinforcing arm (5) is connected to the loading part (4) through a fourth pivot (52).

3. The mechanical limiting mechanism of claim 2, wherein a relationship between a distance L3 from a part of the reinforcing arm (5) for contacting with the spring arm (3) to the axis of the fourth pivot (52) and a radius R of the spring arm (3) is:

$$L3 = L1^* \sqrt{1 - \left(\frac{H}{L4}\right)^2} - h - R;$$

wherein, L1 is an axial distance between the first pivot (31) and the third pivot (51), L4 is an axial distance between the third pivot (51) and the fourth pivot (52), h is a gap formed between the part of the reinforcing arm (5) for contacting with the spring arm (3) and an outer wall of the spring arm (3), and His a distance of descending of the loading part (4).

4. The mechanical limiting mechanism of claim 1, wherein along the arm length direction of the reinforcing arm (5), the groove-shaped structure of the reinforcing arm (5) comprises end plates (301) arranged at two ends of the groove-shaped structure, and the end plates (301) are all connected to side walls of the groove-shaped structure; and wherein one side of the end plates facing the spring arm (3) is formed into a curved surface, and the curved surface coincides with the cross-sectional shape of the spring arm (3).

5. The mechanical limiting mechanism of claim 1, wherein the spring arm (3) is arranged as a cylindrical structure, the surface of the reinforcing arm (5) close to the spring arm (3) is a cambered surface, the cambered surface at least partially coincides with the cylindrical surface and is for abutting against the spring arm (3), and the reinforcing arm (5) is configured as a hollow structure or a solid structure.

6. The mechanical limiting mechanism of claim 1, wherein the spring arm (3) is arranged as a cylindrical structure, the surface of the reinforcing arm (5) close to the spring arm (3) is a flat surface, and the flat surface is for abutting against the spring arm (3).

7. The mechanical limiting mechanism of claim 1, wherein the spring arm (3) is in contact with the reinforcing arm (5) through a first limit part (33) thereof, the reinforcing arm (5) is in contact with the spring arm (3) through a second limit part (53) thereof, and the first limit part (33) is abutted against the second limit part (53) to limit the spring arm (3).

8. The mechanical limiting mechanism of claim 1, wherein the spring arm (3) comprises a bar (36), a spring (37) is disposed in the bar (36), and one end of the spring (37) is connected to the bar (36), and the other end of the spring (37) is connected to the swivel base (2), and keep the spring (37) in a stretched state.

9. The mechanical limiting mechanism of claim 1, wherein the mechanical limiting mechanism further comprises a first connecting rod (34) and a second connecting rod (35), wherein one end of the first connecting rod (34) is fixedly connected to the spring arm (3), and the other end of the first connecting rod (34) is hinged to the swivel base (2); and wherein one end of a second connecting rod (35) is fixedly connected to the spring arm (3), and the other end of the first connecting rod (34) is hinged to the loading part (4).

* * * * *